(12) United States Patent
Lee et al.

(10) Patent No.: US 11,460,965 B2
(45) Date of Patent: Oct. 4, 2022

(54) TOUCH PANEL AND METHOD OF MANUFACTURING THE SAME

(71) Applicant: TPK Advanced Solutions Inc., Fujian (CN)

(72) Inventors: Lien Hsin Lee, Taipei (TW); Chun Yan Wu, Xiamen (TW); Tai Shih Cheng, Taipei (TW)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/004,152

(22) Filed: Aug. 27, 2020

(65) Prior Publication Data
US 2022/0066593 A1 Mar. 3, 2022

(51) Int. Cl.
*G06F 3/044* (2006.01)

(52) U.S. Cl.
CPC .......... *G06F 3/0445* (2019.05); *G06F 3/0446* (2019.05); *G06F 2203/04103* (2013.01); *G06F 2203/04107* (2013.01)

(58) Field of Classification Search
CPC .................. G06F 3/0445; G06F 3/0446; G06F 2203/04107; G06F 2203/04103
See application file for complete search history.

(56) References Cited

U.S. PATENT DOCUMENTS

| | | | | |
|---|---|---|---|---|
| 2013/0335822 | A1* | 12/2013 | Yeh | H05K 3/4685 359/483.01 |
| 2014/0035860 | A1* | 2/2014 | Wong | G06F 3/0443 345/174 |
| 2014/0063373 | A1* | 3/2014 | Wu | G02F 1/13338 349/12 |
| 2014/0300831 | A1* | 10/2014 | Yang | G06F 3/0445 349/12 |
| 2015/0060125 | A1* | 3/2015 | Stevenson | G06F 3/0443 174/261 |
| 2016/0162072 | A1* | 6/2016 | Xie | G06F 3/047 345/174 |
| 2017/0097708 | A1* | 4/2017 | Jin | C03C 15/00 |
| 2018/0107314 | A1* | 4/2018 | Wang | G06F 3/0412 |
| 2018/0323240 | A1* | 11/2018 | Won | H01L 27/3276 |

FOREIGN PATENT DOCUMENTS

| | | |
|---|---|---|
| TW | I583561 B | 5/2017 |
| TW | I584167 B | 5/2017 |
| TW | I659350 B | 5/2019 |
| TW | M604001 U | 11/2020 |

OTHER PUBLICATIONS

Chia-Ching Wu, Highly flexible touch screen panel fabricated with silver-inserted transparent ITO triple-layer structures; Published Mar. 27, 2018; The Royal Society of Chemistry 2018, RSC Adv., 2018, 8, 11862-11870.*

\* cited by examiner

*Primary Examiner* — Md Saiful A Siddiqui
(74) *Attorney, Agent, or Firm* — Cooper Legal Group, LLC

(57) ABSTRACT

A touch panel includes a substrate, a first sensing electrode layer, and a second sensing electrode layer. The first sensing electrode layer is disposed on the substrate and includes a plurality of first-axis conductive units separated from each other. The second sensing electrode layer is disposed on the substrate and includes a plurality of second-axis conductive units separated from each other and crossing the first-axis conductive units. Each of the second-axis conductive units includes two first conductive layers and a second conductive layer laminated between the first conductive layers.

20 Claims, 3 Drawing Sheets

TOUCH PANEL AND METHOD OF MANUFACTURING THE SAME

BACKGROUND

Technical Field

The present disclosure relates to a touch panel and a method of manufacturing the same.

Description of Related Art

With the diversified development of touch modules, touch modules have been maturely applied to industrial electronics and consumer electronics products. Touch products that combine various applications on medium-sized and large-sized products will become more and more common.

However, for a conventional touch module that uses ITO (e.g., a transparent conductive indium tin oxide layer) as the touch electrode, due to the large resistance of ITO, the application of this conventional touch module in the field of medium-sized and large-sized products is relatively limited.

Accordingly, how to provide a touch panel to solve the aforementioned problems has become an important issue to be solved by those in the industry.

SUMMARY

An aspect of the disclosure is to provide a touch panel that can efficiently solve the aforementioned problems.

According to an embodiment of the disclosure, a touch panel includes a substrate, a first sensing electrode layer, and a second sensing electrode layer. The first sensing electrode layer is disposed on the substrate and includes a plurality of first-axis conductive units separated from each other. The second sensing electrode layer is disposed on the substrate and includes a plurality of second-axis conductive units separated from each other and crossing the first-axis conductive units. Each of the second-axis conductive units includes two first conductive layers and a second conductive layer laminated between the two first conductive layers. Resistances of the two first conductive layers are greater than a resistance of the second conductive layer.

In an embodiment of the disclosure, the touch panel further includes a first insulating layer and a second insulating layer. The first insulating layer covers the first-axis conductive units to electrically isolate the first-axis conductive units from the second-axis conductive units. The second insulating layer covers the second-axis conductive units.

In an embodiment of the disclosure, the second insulating layer includes a high refractive index material.

In an embodiment of the disclosure, the high refractive index material is a liquid sol-gel or a liquid high refractive index optical coating.

In an embodiment of the disclosure, a refractive index of the high refractive index material is substantially in a range from 1.6 to 1.8.

In an embodiment of the disclosure, the second insulating layer covers and contacts a surface of the second conductive layer exposed by the two first conductive layers.

In an embodiment of the disclosure, a material of the two first conductive layers includes Indium Tin Oxide (ITO).

In an embodiment of the disclosure, a material of the second conductive layer includes silver.

In an embodiment of the disclosure, a thickness of the second conductive layer is substantially in a range from 5 nm to 15 nm.

In an embodiment of the disclosure, thicknesses of the two first conductive layers at opposite sides of the second conductive layer are substantially in a range from 30 nm to 50 nm.

In an embodiment of the disclosure, the second conductive layer and the two first conductive layers form a multilayer conductive layer. A sheet resistance of the multilayer conductive layer is substantially in a range from 6.76 ohm/sq to 9.6 ohm/sq.

According to an embodiment of the disclosure, a method of manufacturing a touch panel includes: forming a first sensing electrode layer on a substrate, in which the first sensing electrode layer includes a plurality of first-axis conductive units separated from each other; forming a first insulating layer to cover the first-axis conductive units; forming a second sensing electrode layer on the substrate, in which the second sensing electrode layer includes a plurality of second-axis conductive units separated from each other and crossing the first-axis conductive units, each of the second-axis conductive units includes two first conductive layers and a second conductive layer laminated between the two first conductive layers, and resistances of the two first conductive layers are greater than a resistance of the second conductive layer; and forming a second insulating layer to cover the second-axis conductive units.

In an embodiment of the disclosure, the forming the second insulating layer includes forming the second insulating layer by a slit coating process or an inject printing process.

Accordingly, in the touch panel of the present disclosure, since each of the second-axis conductive units is a composite conductive structure including two first conductive layers with a greater resistance and a second conductive layer with a smaller resistance laminated between the two first conductive layers, the resistance of the circuit in the touch region of the touch panel can be effectively reduced, so that the touch panel is suitable for use in the design of medium-sized and large-sized touch modules.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
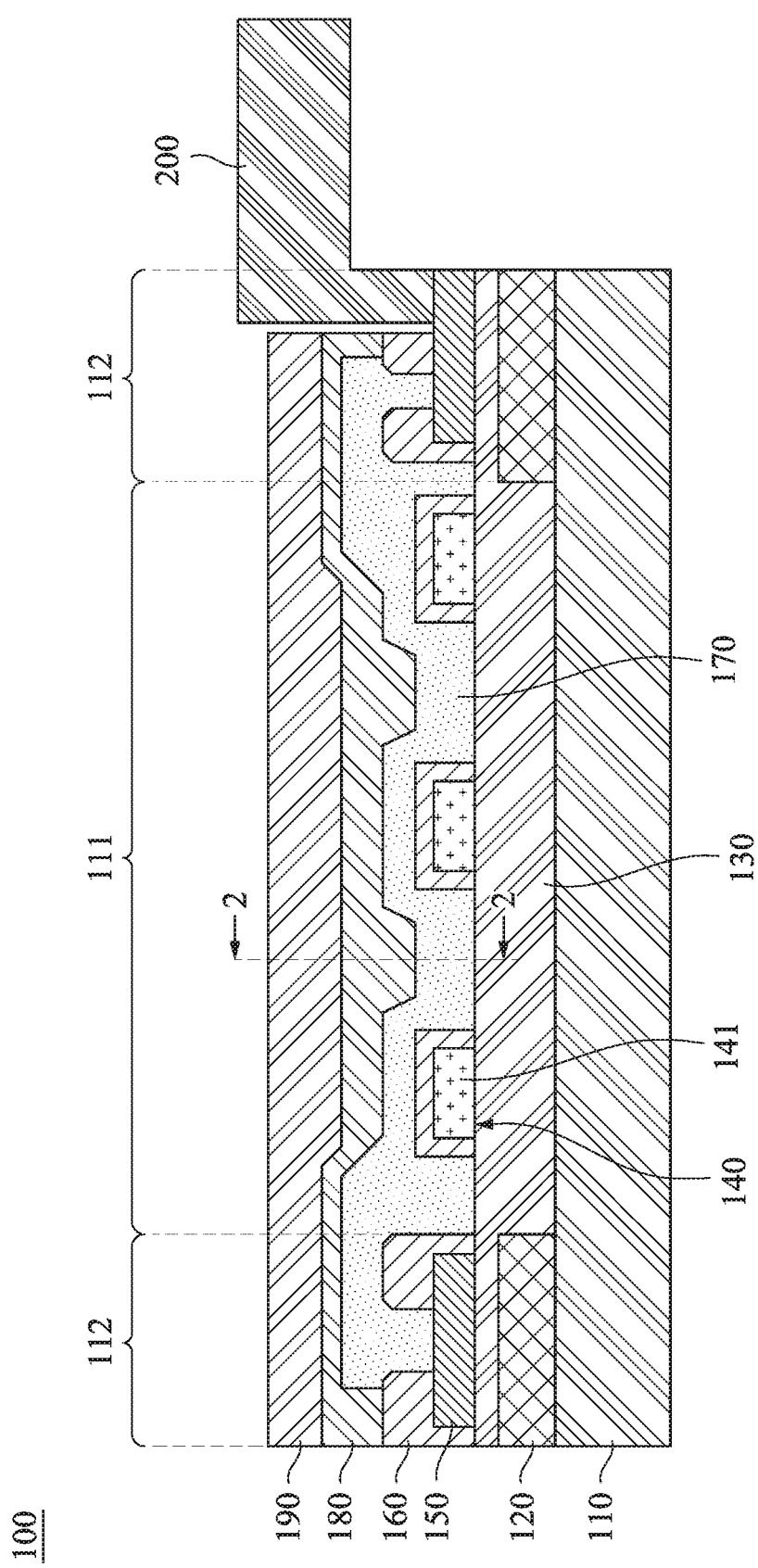
FIG. 1 is a schematic diagram of a touch panel according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of a touch panel 100 according to an embodiment of the disclosure. As shown in FIG. 1, in the present embodiment, a touch panel 100 includes a substrate 110, a shielding layer 120, an optical matching layer 130, and a plurality of traces 150. The substrate 110 defines thereon a touch region 111 and a peripheral region 112 surrounding the touch region 111. The shielding layer 120 is disposed in the peripheral region 112 of the substrate 110. The optical matching layer 130 is disposed on the substrate 110 and covers the shielding layer 120, so as to provide a flat upper surface. The traces 150 are disposed on the optical matching layer 130 and located in the peripheral region 112. Hence, when viewed from the bottom surface of the substrate 110, the shielding layer 120 can shield the traces 150 from the viewer.

Figure 2:
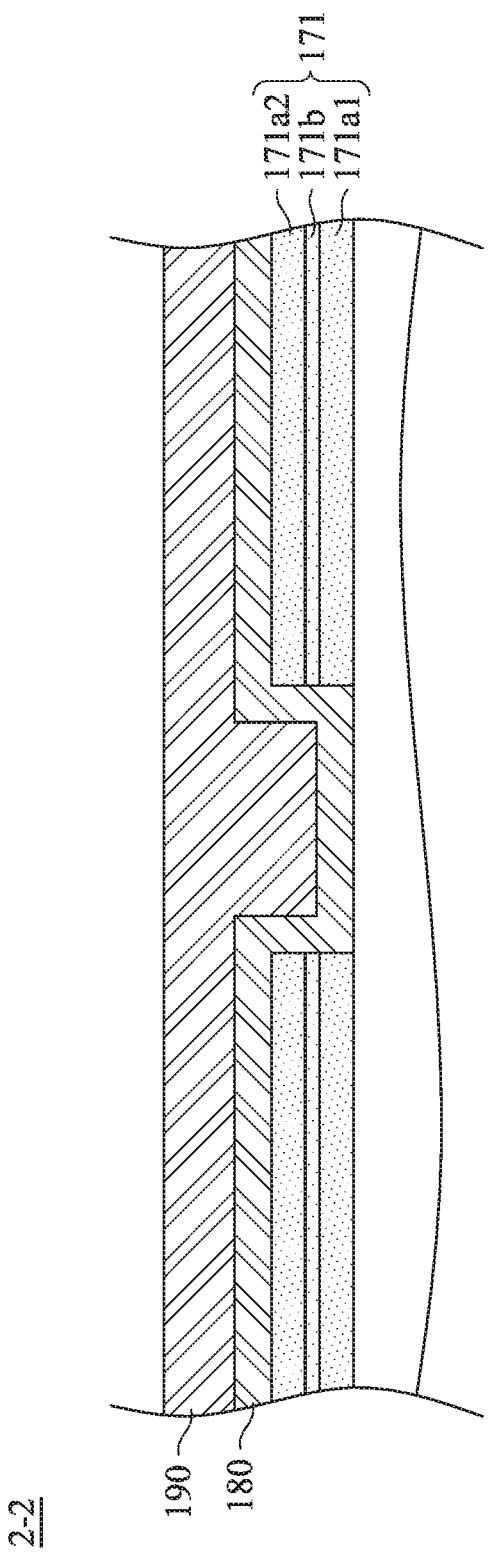
FIG. 2 is a partial cross-sectional view of the touch panel in FIG. 1 taken along line 2-2.

As shown in FIG. 1, the touch panel 100 further includes a first sensing electrode layer 140, a second sensing electrode layer 170, a first insulating layer 160, a second insulating layer 180 (with the effect of a second optical matching layer, refer to the description below), a protective layer 190, and a flexible circuit board 200. The first sensing electrode layer 140 is disposed on the optical matching layer 130 on the substrate 110 and includes a plurality of first-axis conductive units 141 (only one is shown in FIG. 1) that are separated from each other in the touch region 111. The second sensing electrode layer 170 is disposed on the optical matching layer 130 on the substrate 110 and includes a plurality of second-axis conductive units 171 (FIG. 2 shows two of the second-axis conductive units 171 side by side horizontally) that are separated from each other and cross the first-axis conductive units 141 in the touch region 111. The first insulating layer 160 covers the first-axis conductive units 141 to electrically isolate the first-axis conductive units 141 from the second-axis conductive units 171. The second insulating layer 180 covers the second-axis conductive units 171. The protective layer 190 covers the second insulating layer 180. The flexible circuit board 200 is connected to the traces 150 located in the peripheral region 112 and extracts a touch signal between the first sensing electrode layer 140 and the second sensing electrode layer 170 through the traces 150.

Specifically, the aforementioned "first-axis" and "second-axis" are, for example, two mutually perpendicular axes (e.g., X axis and Y axis). In other words, the first-axis conductive units 141 are conductive lines extending along the first axis and can be arranged at intervals along the second axis. The second-axis conductive units 171 are conductive lines extending along the second axis and can be arranged at intervals along the first axis.

In addition, the second-axis conductive units 171 cross the first-axis conductive units 141 from above, and the first insulating layer 160 electrically insulates at least at the intersections between the first-axis conductive units 141 and the second-axis conductive units 171. It can be seen that the second sensing electrode layer 170 is separated from the first sensing electrode layer 140 by the first insulating layer 160 to form bridge-like structures, so the touch panel 100 of the present embodiment is an OGS (One Glass Solution) touch module.

In some embodiments, a material of the substrate 110 includes glass, but the present disclosure is not limited in this regard.

Reference is made to FIG. 2. FIG. 2 is a partial cross-sectional view of the touch panel 100 in FIG. 1 taken along line 2-2. As shown in FIG. 2, each of the second-axis conductive units 171 includes two first conductive layers 171$a$1, 171$a$2 and a second conductive layer 171$b$. The second conductive layer 171$b$ is laminated between the two first conductive layers 171$a$1, 171$a$2. Resistances of the two first conductive layers 171$a$1, 171$a$2 are greater than a resistance of the second conductive layer 171$b$. In this way, the second sensing electrode layer 170 can effectively reduce the resistance of the circuit of the touch panel 100 in the touch region 111, so that the touch panel 100 is suitable for use in the design of medium-sized and large-sized touch modules.

In some embodiments, a material of the two first conductive layers 171$a$1, 171$a$2 includes Indium Tin Oxide (ITO). In this way, the first conductive layers 171$a$1, 171$a$2 can have a good light transmittance. In some embodiments, the second conductive layer 171$b$ includes a thinned material layer with high light transmittance and high conductivity, such as a nano-silver ink layer, a nano-silver paste layer, or a nano-sputter layer, but the present disclosure is not limited in this regard. Hence, the second conductive layer 171$b$ can have a lower impedance value.

With the foregoing configurations, the second sensing electrode layer 170 can have a good light transmittance and an excellent low impedance value.

As shown in FIG. 2, the second insulating layer 180 covers and contacts a surface of the second conductive layer 171 b exposed by the two first conductive layers 171$a$1, 171$a$2. In this way, in addition to improving the protection to the second conductive layer 171$b$, the second insulating layer 180 can also effectively prevent the metal in the second conductive layer 171$b$ from drifting in the subsequent manufacturing process.

In some embodiments, the second insulating layer 180 includes a high refractive index material. In some embodiments, the high refractive index material is a liquid sol-gel or a liquid high refractive index optical coating. In some embodiments, a refractive index of the high refractive index material is substantially in a range from about 1.6 to about 1.8 (preferably about 1.63) for the visible spectrum or visible light (having a wavelength range from about 390 nm to about 780 nm; preferably the refractive index is measured at a wavelength of about 550 nm).

In some embodiments, a thickness of the second conductive layer 171$b$ is substantially in a range from about 5 nm to about 15 nm (preferably about 10 nm).

In some embodiments, such as ITO-Al-ITO (i.e., IAI structure, in which ITO is used as the material of the first conductive layers 171$a$1, 171$a$2, and Al is used as the material of the second conductive layer 171$b$), when the thickness of the second conductive layer 171$b$ is substantially in the range from 5 nm to 15 nm (preferably about 10 nm) and thicknesses of the first conductive layers 171$a$1, 171$a$2 on both sides of the second conductive layer 171$b$ are substantially in a range from 30 nm to 50 nm, a sheet resistance of the IAI structure (also known as a multilayer conductive layer) is substantially in a range from 6.76 ohm/sq to 9.6 ohm/sq.

With the foregoing configurations, the chromaticity of the second sensing electrode layer 170 can be appropriately adjusted, and the etching lines of the second sensing electrode layer 170 can be effectively erased.

Figure 3:
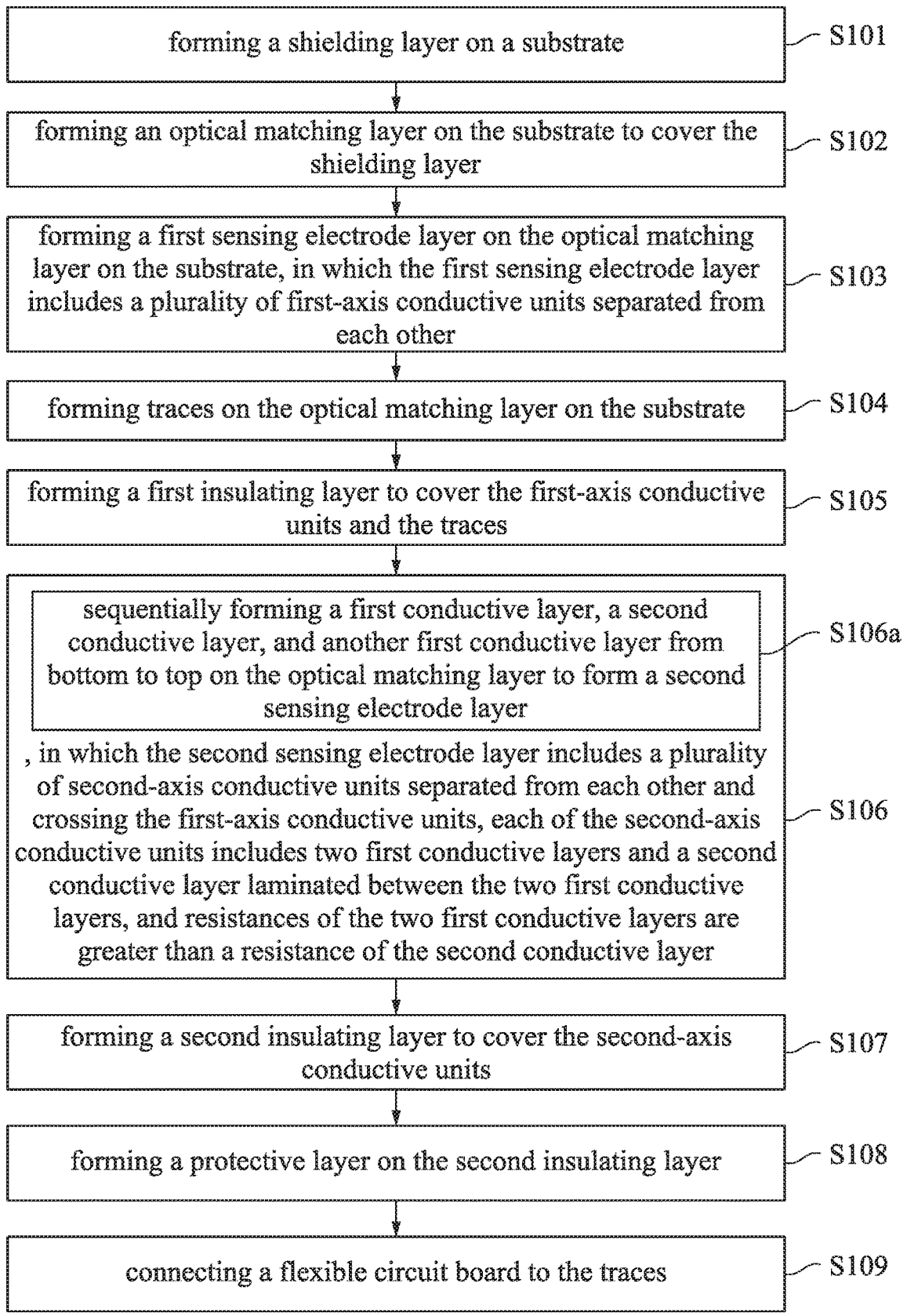
FIG. 3 is a flowchart of a method of manufacturing a touch panel according to an embodiment of the disclosure.

Reference is made to FIG. 3. FIG. 3 is a flowchart of a method of manufacturing a touch panel according to an embodiment of the disclosure. As shown in FIG. 3, the method of manufacturing a touch panel includes step S101 to step S109.

In step S101, a shielding layer is formed on a substrate.

In step S102, an optical matching layer is formed on the substrate to cover the shielding layer.

In step S103, a first sensing electrode layer is formed on the optical matching layer on the substrate, in which the first sensing electrode layer includes a plurality of first-axis conductive units separated from each other.

In step S104, traces are formed on the optical matching layer on the substrate.

In step S105, a first insulating layer is formed to cover the first-axis conductive units and the traces.

In step S106, a second sensing electrode layer is formed on the optical matching layer on the substrate, in which the second sensing electrode layer includes a plurality of second-axis conductive units separated from each other and crossing the first-axis conductive units, each of the second-axis conductive units includes two first conductive layers and a second conductive layer laminated between the two first conductive layers, and resistances of the two first conductive layers are greater than a resistance of the second conductive layer.

In step S107, a second insulating layer is formed to cover the second-axis conductive units.

In step S108, a protective layer is formed on the second insulating layer.

In step S109, a flexible circuit board is connected to the traces.

In practical applications, the order of step S103 and step S104 can be exchanged. The sequence of step S109 after step S104 can be adjusted arbitrarily.

In some embodiments, step S106 includes step S106a: sequentially forming a first conductive layer, a second conductive layer, and another first conductive layer from bottom to top on the optical matching layer to form the second sensing electrode layer.

In some embodiments, step S107 includes forming the second insulating layer by a slit coating process or an inject printing process.

According to the foregoing recitations of the embodiments of the disclosure, it can be seen that in the touch panel of the present disclosure, since each of the second-axis conductive units is a composite conductive structure including two first conductive layers with a greater resistance and a second conductive layer with a smaller resistance laminated between the two first conductive layers, the resistance of the circuit in the touch region of the touch panel can be effectively reduced, so that the touch panel is suitable for use in the design of medium-sized and large-sized touch modules.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch panel, comprising:
a substrate;
an optical matching layer disposed on the substrate;
a first sensing electrode layer disposed on the substrate over the optical matching layer, wherein the first sensing electrode layer comprises a plurality of first-axis conductive units separated from each other; and
a second sensing electrode layer disposed on the substrate over the first sensing electrode layer, wherein:
the second sensing electrode layer directly contacts the optical matching layer,
the second sensing electrode layer comprises a plurality of second-axis conductive units separated from each other and crossing the first-axis conductive units, and
each of the second-axis conductive units comprises:
two first conductive layers; and
a second conductive layer laminated between the two first conductive layers, wherein a resistance of each of the two first conductive layers is greater than a resistance of the second conductive layer.

2. The touch panel of claim 1, further comprising:
a first insulating layer covering the first-axis conductive units to electrically isolate the first-axis conductive units from the second-axis conductive units; and
a second insulating layer covering the second-axis conductive units.

3. The touch panel of claim 2, wherein the second insulating layer comprises a high refractive index material.

4. The touch panel of claim 3, wherein the high refractive index material is a liquid sol-gel or a liquid high refractive index optical coating.

5. The touch panel of claim 3, wherein a refractive index of the high refractive index material is substantially in a range from 1.6 to 1.8.

6. The touch panel of claim 2, wherein the second insulating layer covers and directly contacts a surface of the second conductive layer exposed by the two first conductive layers.

7. The touch panel of claim 1, wherein a material of the two first conductive layers comprises Indium Tin Oxide (ITO).

8. The touch panel of claim 1, wherein a material of the second conductive layer comprises silver.

9. The touch panel of claim 8, wherein a thickness of the second conductive layer is substantially in a range from 5 nm to 15 nm.

10. The touch panel of claim 9, wherein thicknesses of the two first conductive layers at opposite sides of the second conductive layer are substantially in a range from 30 nm to 50 nm.

11. The touch panel of claim 10, wherein the second conductive layer and the two first conductive layers form a multilayer conductive layer, and a sheet resistance of the multilayer conductive layer is substantially in a range from 6.76 ohm/sq to 9.6 ohm/sq.

12. The touch panel of claim 1, wherein the touch panel is a one glass solution (OGS) touch module.

13. The touch panel of claim 1, further comprising a first insulating layer in direct contact with a top surface of an uppermost one of the two first conductive layers.

14. The touch panel of claim 13, further comprising a protective layer in direct contact with a top surface of the first insulating layer.

15. The touch panel of claim 1, wherein the optical matching layer is in direct contact with a bottom surface of the first sensing electrode layer and a bottom surface of the second sensing electrode layer.

16. A method of manufacturing a touch panel, comprising:
forming an optical matching layer on a substrate;
forming a first sensing electrode layer on the substrate over the optical matching layer, wherein the first sensing electrode layer comprises a plurality of first-axis conductive units separated from each other;
forming a first insulating layer over the first-axis conductive units to cover the first-axis conductive units;
forming a second sensing electrode layer on the substrate and over the first insulating layer, wherein:
the second sensing electrode layer directly contacts the optical matching layer,
the second sensing electrode layer comprises a plurality of second-axis conductive units separated from each other and crossing the first-axis conductive units,
each of the second-axis conductive units comprises two first conductive layers and a second conductive layer laminated between the two first conductive layers, and
a resistance of each of the two first conductive layers is greater than a resistance of the second conductive layer; and
forming a second insulating layer over the second-axis conductive units and over the first-axis conductive units to cover the second-axis conductive units.

17. The method of claim 16, wherein the forming the second insulating layer comprises:
forming the second insulating layer by a slit coating process or an inject printing process.

18. A touch panel, comprising:
an optical matching layer disposed on a substrate;
a first sensing electrode layer disposed on the substrate over the optical matching layer, wherein the first sensing electrode layer directly contacts a top surface of the optical matching layer and comprises a plurality of first-axis conductive units separated from each other; and
a second sensing electrode layer disposed on the substrate over the first sensing electrode layer, wherein the second sensing electrode layer directly contacts the top surface of the optical matching layer and comprises a plurality of second-axis conductive units separated from each other and crossing the first-axis conductive units, wherein each of the second-axis conductive units comprises:
two first conductive layers; and
a second conductive layer laminated between the two first conductive layers, wherein a resistance of each of the two first conductive layers is greater than a resistance of the second conductive layer.

19. The touch panel of claim 18, further comprising:
a first insulating layer directly contacting the top surface of the optical matching layer and covering the second-axis conductive units.

20. The touch panel of claim 19, wherein the touch panel is a one glass solution (OGS) touch module.

* * * * *